United States Patent [19]
Zimmerman

[11] 3,989,282
[45] Nov. 2, 1976

[54] PLUG-TYPE DEVICE FOR INTERCONNECTING CONDUITS

[75] Inventor: Harry M. Zimmerman, San Diego, Calif.

[73] Assignee: Reed Irrigation Systems, El Cajon, Calif.

[22] Filed: Aug. 11, 1975

[21] Appl. No.: 603,493

[52] U.S. Cl. ............................... 285/222; 29/523; 285/382.4; 403/248
[51] Int. Cl.² ........................................ F16L 41/00
[58] Field of Search ........... 285/192, 208, 209, 210, 285/162, 382 US, 222, 334.5, 382.4, 382.5, 258; 403/248, 264, 240, 167, 230; 182/228; 29/523

[56] References Cited
UNITED STATES PATENTS

| | | | |
|---|---|---|---|
| 980,901 | 1/1911 | Ballantyne | 285/208 X |
| 1,738,915 | 12/1929 | Mueller | 285/382.4 X |
| 1,742,793 | 1/1930 | Staples | 285/382.4 X |
| 1,902,229 | 3/1933 | Goetzelman | 285/208 |
| 2,552,791 | 5/1951 | Johnson | 285/258 |
| 2,835,513 | 5/1958 | Pearson | 285/222 |
| 3,073,627 | 1/1963 | Ritter | 403/248 X |
| 3,114,969 | 12/1963 | Roth | 285/162 X |
| 3,490,791 | 1/1970 | Mitchell | 285/208 X |
| 3,568,977 | 3/1971 | Nelson | 285/162 X |
| 3,841,667 | 10/1974 | Sands | 285/222 X |

FOREIGN PATENTS OR APPLICATIONS 1,190,238  4/1970  United Kingdom ................ 285/222

*Primary Examiner*—Thomas F. Callaghan
*Attorney, Agent, or Firm*—Owen, Wickersham & Erickson

[57] ABSTRACT

A device to facilitate the connection of a relatively small diameter hose to a larger diameter pipe has a tubular plug-like configuration with a flared portion at one end and a cylindrical portion at the other end. With the cylindrical portion placed within the end of the hose, both the device and the hose are inserted through a side opening in the pipe. When inside the pipe the hose is pushed further onto the flared end portion of the device so that the hose is stretched to a diameter larger than the opening. Tension on the hose causes it to lodge tightly in the opening and form a permanent connection.

1 Claim, 5 Drawing Figures

U.S. Patent  Nov. 2, 1976  3,989,282
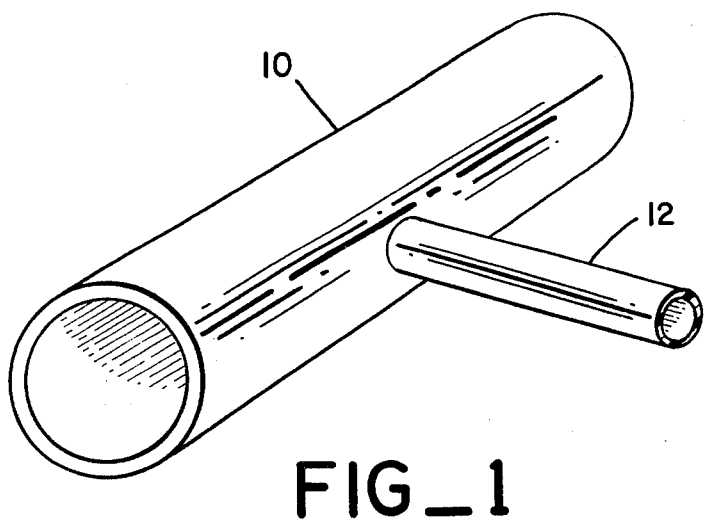
FIG_1
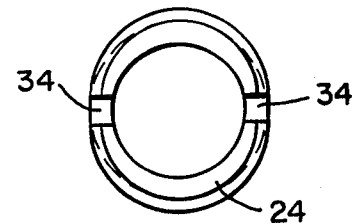
FIG_5
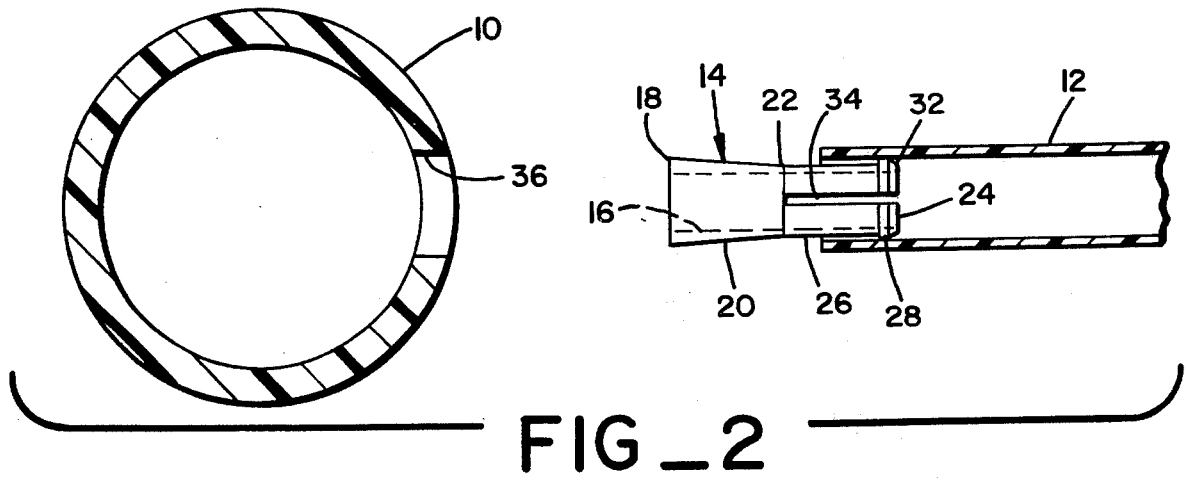
FIG_2
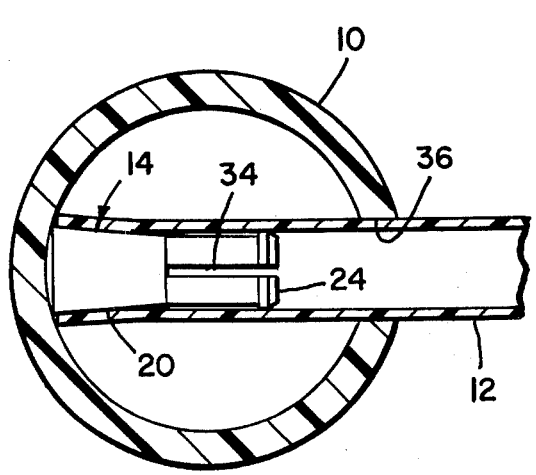
FIG_3
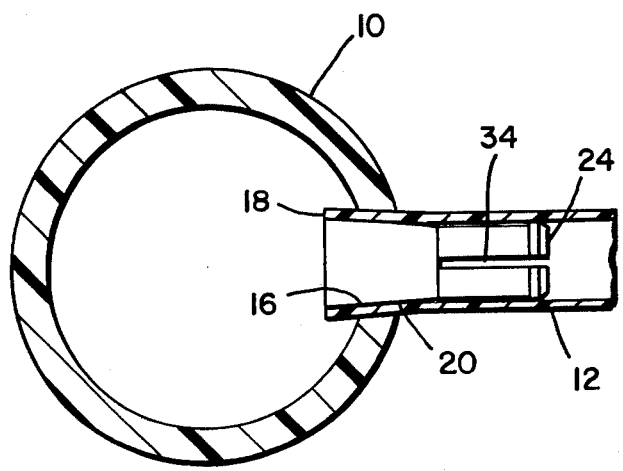
FIG_4

PLUG-TYPE DEVICE FOR INTERCONNECTING CONDUITS

This invention relates to a device for interconnecting fluid conduits and more particularly for connecting a smaller diameter conduit as a side branch to a conduit of a larger diameter.

In many fluid systems it is necessary to tap a main supply conduit at spaced apart intervals or at preselected locations to provide side branch lines. For example, in drip irrigation systems many such side branch lines are often required to service preselected areas in large orchards, vineyards and similar plantings that require irrigation. To accommodate such systems a simple but durable means was required to interconnect the smaller branch lines with a larger conduit pipe. The problem was increased by the fact that for most irrigation systems, plastic materials of different characteristics were used for both the conduit pipe and the branch lines. Generally, the conduit pipe was made of a relatively rigid polyvinylchloride material, whereas the smaller branch lines were of a more flexible plastic, such as polyethylene.

It is therefore one object of the present invention to solve the aforesaid problems by providing a device for making a durable, non-leaking connection between a pipe and a conduit with a smaller diameter.

Other objects of the invention are to provide a tubular device for making a conduit interconnection between conduits of different diameters that can be accomplished rapidly, in the field, with unskilled labor and simple tools.

A further object of the present invention is to provide a device for making a side branch interconnection between two conduits that is particularly well adapted for ease and economy of manufacture in large quantities.

BRIEF SUMMARY OF THE INVENTION

The foregoing objects are accomplished by a plug-like device having a tubular configuration with a flared or conical surface at one end and a cylindrical surface at the opposite end. The end portion with a cylindrical surface is adapted to fit within the end of a smaller conduit section which is to be interconnected to a larger conduit or pipe. A side opening is provided in the pipe wall having a diameter only slightly larger than the flared end of the device so that the device with the smaller conduit attached to its cylindrical end can be inserted through the side opening. When the device and end of the smaller conduit are through the opening the conduit is pushed further until it slides fully onto the flared end portion of the device. Subsequent tension on the smaller conduit causes the flared end with the smaller conduit around it to jam into the side opening. The device prevents the smaller conduit from being pulled out of the opening and a fluid tight seal is formed around the edge of the opening against the outer surface of the smaller conduit. Other objects, advantages and features of the invention will become apparent from the following detailed description presented in conjunction with the accompany drawing.

BRIEF DESCRIPTION OF THE DRAWING

FIG. 1 is a view in perspective showing a typical interconnection of large and small conduit sections utilizing a connector device according to the present invention;

FIG. 2 is an exploded view in section showing a connector device of the present invention installed in a smaller conduit prior to being connected to a larger conduit;

FIG. 3 is a view in section showing the connector device and conduits of FIG. 2 at an intermediate position during a typical connection procedure;

FIG. 4 is a view similar to FIG. 3 showing the conduits fully connected with the connector device properly in place; and FIG. 5 is an enlarged and view of the connector device.

DETAILED DESCRIPTION OF EMBODIMENT

With reference to the drawing, FIG. 1 shows a typical union of a relatively large diameter conduit 10 with a smaller diameter conduit 12 which is accomplished with a connector device 14, as shown in FIG. 2. Such a union may be required in a wide variety of fluid systems and particularly in drip irrigation systems where the conduit 10 is usually a long pipe of relatively rigid material such as polyvinylchloride with a large number of small conduits 12 connected to it at spaced apart intervals. The small conduits are preferably made of somewhat flexible plastic material such as polyethylene.

In accordance with the invention, the connector device 14 is made of a rigid or semi-rigid plastic such as molded p.v.c. and has generally a tubular configuration with an axially extending cylindrical passage 16 that is open at both ends. Extending from one end 18, the connector device has a smooth conical surface 20 that tapers from a maximum diameter at the end 18 to a somewhat smaller diameter at some point 22 that is approximately one half the length of the device. From this point to near the other end 24 the device has a cylindrical outer surface 26 with a substantially uniform diameter. At the end 24 is a flange 28 having a diameter slightly larger than the cylindrical surface 26 but not as large as the large end of the conical surface 20. The outer edge 32 is preferably beveled so that it will slide easily into the end of a smaller conduit 12. Extending axially from the end 24 to the point 22 along the device 14 are a pair of axial slots 34 which bifurcate the device into two connected portions that can be forced together to reduce the overall diameter of the device and give it a wedge-like configuration at that end, thereby further facilitating its installation within the small conduit.

The procedure for utilizing the device 14 to make a connection between two conduits may be readily understood by reference to FIGS. 2 - 4. As shown in the exploded view of FIG. 2, the connector device is first installed in the end of the small conduit 12 by pushing it manually until all or most of the cylindrical portion is within the conduit. A size of the device is selected so that the outside diameter of its end flange is equal to the conduit's inside diameter. An opening 36 is formed in the larger conduit 10 at the location of the desired union by a suitable drill or tapping tool, and this opening is only slightly larger than the maximum diameter of the flared end of the device.

Now, as shown in FIG. 3, the small conduit 12, with the connector device 14 installed therein, is inserted through the opening 36 until the flared end 18 of the device bears against the inner wall of the larger conduit 10. After this occurs, further axial force on the smaller conduit 12 causes it to move along the conical surface 20 of the device within the larger conduit. Since the smaller conduit is of flexible, pliable material it readily stretches and enlarges in diameter to conform with and fit tightly around the conical surface. At this point the outside diameter of the smaller conduit at the flared end 18 of the device 14 is larger than the opening 36.

As shown in FIG. 4, when the smaller conduit is now pulled away from the larger conduit, the smaller conduit jams within the opening 36 and a fluid tight seal is automatically formed around it. The greater the tension on the smaller conduit, the more effective the seal. The aforesaid installation procedure can be performed quickly in either a shop or in the field and no tools are required once the opening 36 is provided in the larger pipe or conduit. Obviously, various sizes of the connector device 14 can be made to accommodate different conduit sizes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limited.

I claim:

1. A fluid tight joint, comprising:
   a wall bounding a space adapted to receive fluid pressure, said wall having an opening therethrough;
   a semi-rigid conduit of outside diameter at least as small as that of the wall opening; and
   an elongated tubular body of semi-rigid material having an axial inner passage extending therethrough, a conical outer surface on said body tapering from a maximum diameter at one end to a smaller diameter at an intermediate point spaced from the opposite end, the outer surface of said body between said intermediate end and said opposite end being substantially cylindrical, said tubular body having a flange at said opposite end in contact with the inside of the conduit, and a pair of slots extending from said opposite end axially along said cylindrical outer surface and through to said axial passage thereby forming a bifurcated end portion on said body, said bifurcated end portion being biased apart to exert a slight outward force on the inside surface of the conduit;
   the total of said maximum diameter and twice the thickness of the semi-rigid conduit's wall being greater than the diameter of the wall opening;
   said semi-rigid conduit being positioned circumjacent the elongated tubular body with its end generally coincident with said one end of the tubular body, and a portion of the conduit near its end being stretched over the conical outer surface of the tubular body to form a reinforced conical end portion of the conduit;
   said reinforced conical end portion of the conduit, with the tubular body inside, being tightly wedged in the wall opening and oriented toward said space adapted to receive fluid pressure;
   whereby, when fluid pressure increases in the space and in the conduit, the conduit end portion tends to become more tightly wedged in the wall opening to more tightly seal the joint.

* * * * *